United States Patent
Huang

(10) Patent No.: US 6,634,661 B1
(45) Date of Patent: Oct. 21, 2003

(54) KICK SCOOTER SHOCK ABSORBING STRUCTURE

(76) Inventor: Bill Huang, No. 5-15, Lun Ya Lane, Lun Ya Lee, Yuanlin Chen, Changhua Hsien (TW)

( * ) Notice: Subject to any disclaimer, the term of this patent is extended or adjusted under 35 U.S.C. 154(b) by 0 days.

(21) Appl. No.: 09/925,532

(22) Filed: Aug. 10, 2001

(51) Int. Cl.[7] .............................................. B62M 1/00
(52) U.S. Cl. ................................... 280/87.03; 280/276
(58) Field of Search ......................... 280/87.03, 87.041, 280/275, 276, 277, 283

(56) References Cited

U.S. PATENT DOCUMENTS

| | | | | |
|---|---|---|---|---|
| 6,406,042 B1 | * | 6/2002 | Tsai | 280/87.041 |
| 6,409,190 B1 | * | 6/2002 | Tsai | 280/87.041 |
| 6,431,302 B2 | * | 8/2002 | Patmont et al. | 280/87.041 |
| 2002/0089139 A1 | * | 7/2002 | Reynolds et al. | 280/87.041 |
| 2002/0113392 A1 | * | 8/2002 | Lin | 280/87.041 |

FOREIGN PATENT DOCUMENTS

| | | | | |
|---|---|---|---|---|
| CH | 104585 | * | 6/1923 | 280/87.03 |
| FR | 573091 | * | 6/1924 | 280/87.03 |
| FR | 596554 | * | 10/1925 | 280/87.03 |
| FR | 664944 | * | 9/1929 | 280/87.03 |

* cited by examiner

*Primary Examiner*—Daniel G. DePumpo

(57) ABSTRACT

A kick scooter shock absorbing structure includes a front wheel guard fastened the body of a kick scooter, two wheel holder arms pivoted to the front wheel guard to hold a front wheel, and a shock absorber connected to a front end of the front wheel guard and a front pivot hole of each of the wheel holder arms and adapted to absorb shocks from the front wheel, the shock absorber including a locating member coupled between the front pivot hole of each of the wheel holder arms, a shock absorbing body mounted on the front end of the front wheel guard at a top side, a rubber buffer element connected between the front end of the front wheel guard and the locating member, and a locking device, which fastens the shock absorbing body and the rubber buffer element to the front wheel guard and the locating member.

1 Claim, 6 Drawing Sheets

KICK SCOOTER SHOCK ABSORBING STRUCTURE

BACKGROUND AND SUMMARY OF THE INVENTION

The present invention relates to kick scooters and, more specifically, to a kick scooter shock absorbing structure, which is installed in the front wheel guard of the kick scooter to effectively absorb shocks from the front wheel.

FIG. 5 shows a kick scooter shock absorbing structure according to the prior art. According to this arrangement, a shock absorbing member is connected between the main body of the kick scooter and the rear wheel holder frame to absorb shocks from the rear wheel. FIG. 6 shows another kick scooter shock absorbing structure according to the prior art. According to this arrangement, a bicycle pedal sock absorbing spring is used and installed to absorb shocks from the rear wheel. According to the aforesaid two prior art designs, the shock absorbing member and the shock absorbing spring are adapted to absorb shocks from the rear wheel. These two designs cannot directly absorb shocks from the front wheel.

It is the main object of the present invention to provide a kick scooter shock absorbing structure, which is installed in the front side of the kick scooter to absorb shocks from the front wheel. It is another object of the present invention to provide a kick scooter shock absorbing structure, which uses two pivoted wheel holder arms to support the front wheel, and a shock absorber to absorb shocks from the wheel holder arms.

DETAILED DESCRIPTION OF THE PREFERRED EMBODIMENT

Figure 1:
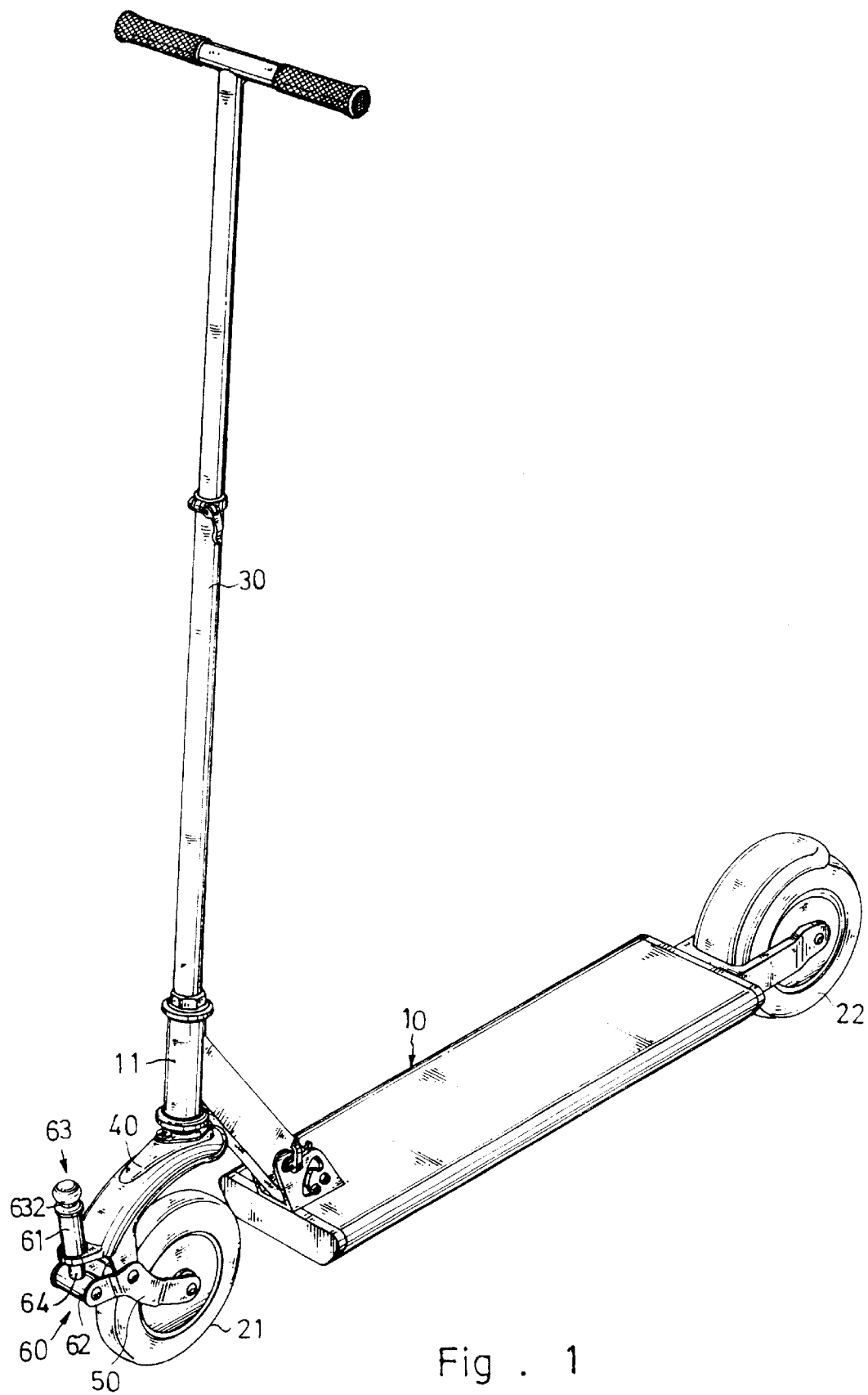
FIG. 1 is an elevational view of a kick scooter sock absorbing structure constructed according to the present invention.
Figure 2:
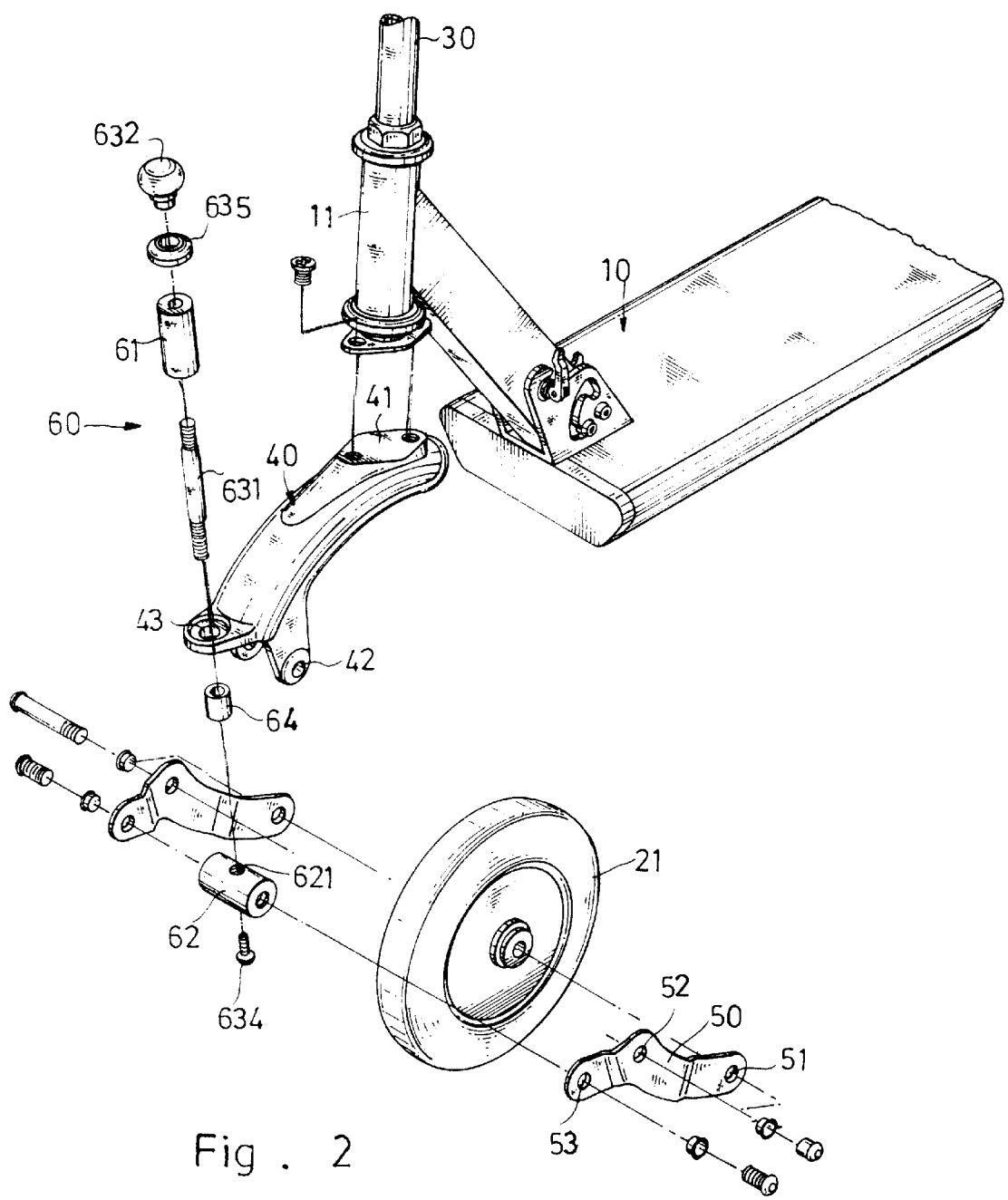
FIG. 2 is an exploded view of the kick scooter shock absorbing structure according to the present invention.
Figure 3:
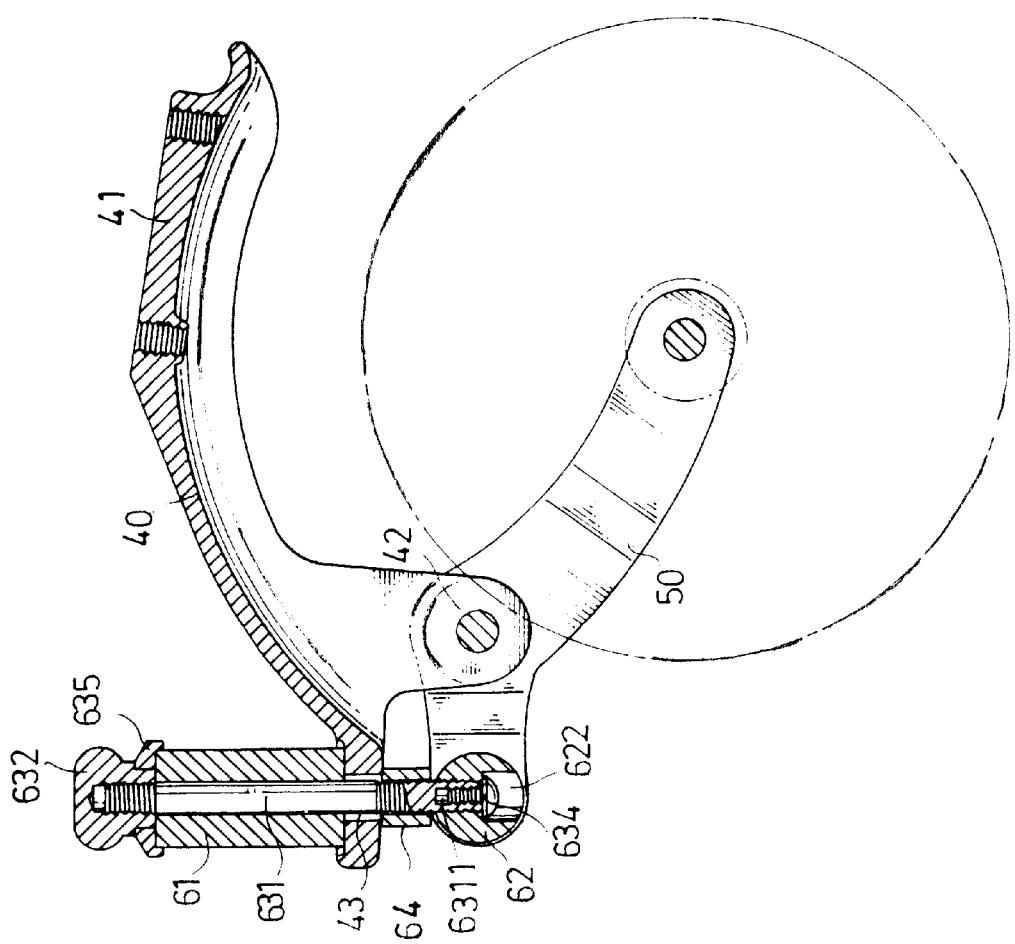
FIG. 3 is a sectional assembly view of the kick scooter shock absorbing structure according to the present invention.

Referring to FIGS. from 1 through 3, a kick scooter is shown comprising a footplate 10, a front wheel 21 and a rear wheel and 22 respectively provided at the front and rear sides of the footplate 10, a head tube 11 connected to the footplate 10, and an upright handle 30 coupled to the head tube 11. The aforesaid structure is similar to conventional kick scooters. The present invention further comprises a front wheel guard 40, two wheel holder arms 50, and a shock absorber 60. The front wheel guard 40 id threaded onto the bottom end of the head tube 11, comprising a rear coupling portion 41 fixedly connected to the head tube 11, a front coupling portion 43, and a bottom coupling portion 42 disposed adjacent to the front coupling portion 43. The wheel holder arms 50 are narrow plate members arranged in parallel, each comprising a rear pivot hole 51 pivotally coupled to the front wheel 21, a front pivot hole 53 connected to the shock absorber 60, and a middle pivot hole 52 pivoted to the bottom coupling portion 42 of the front wheel guard 40. The shock absorber 60 comprises a shock absorbing body 61, a locating member 62, a rubber buffer element 64, and a locking device 63 adapted to secure the shock absorbing body 61, the locating member 62, and the rubber buffer element 64 to the front wheel guard 40 and the wheel holder arms 50.

The shock absorbing body 61 is an elastomeric member disposed at the top side of the front coupling portion 43 of the front wheel guard 40. The locating member 62 is transversely connected between the front pivot hole 53 of each of the wheel holder arms 50, having a lock hole 621 transversely extended in the middle and a countersunk hole 622 disposed in communication with one end of the locating hole 621. The rubber buffer element 64 is connected between the locating member 62 and the front wheel guard 40. The locking device 63 comprises a pull rod 631, an adjustment knob 632, a fastening element, for example, a screw 634, and an adjustment pad 635. The pull rod 631 is inserted through the shock absorbing body 61, the front coupling portion 43 of the front wheel guard 40, and the rubber buffer element 64, and then fixedly connected to the locating hole 621 of the locating member 62 by the screw 634. The screw 634 is mounted in the countersunk hole 622 and threaded into a bottom screw hole 6311 of the pull rod 63 to fixedly secure the pull rod 631 to the locating member 62. The adjustment knob 632 is fastened to the top end of the pull rod 631 and disposed above the shock absorbing body 61. The adjustment pad 635 is connected between the shock absorbing body 61 and the adjustment knob 632.

Figure 4:
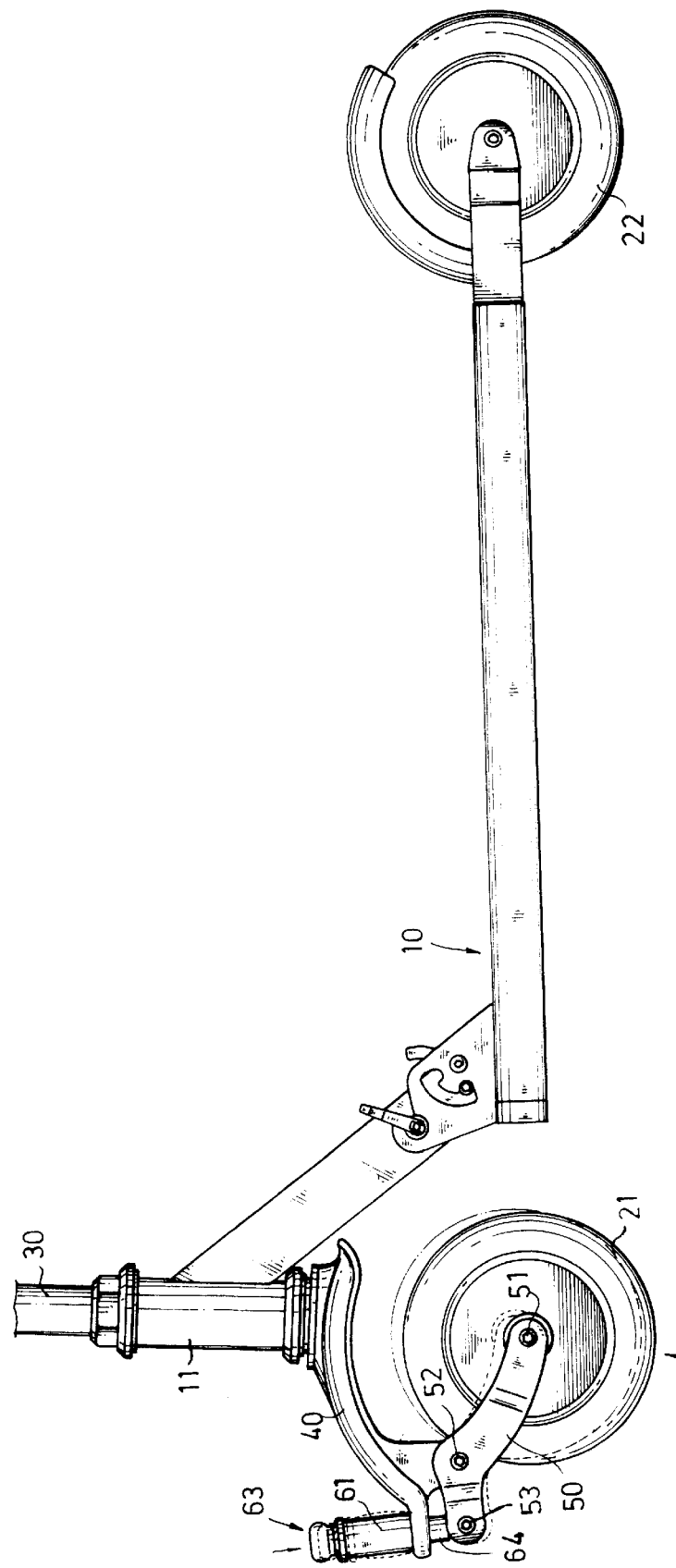
FIG. 4 illustrates the operation of the present invention.
Figure 5:
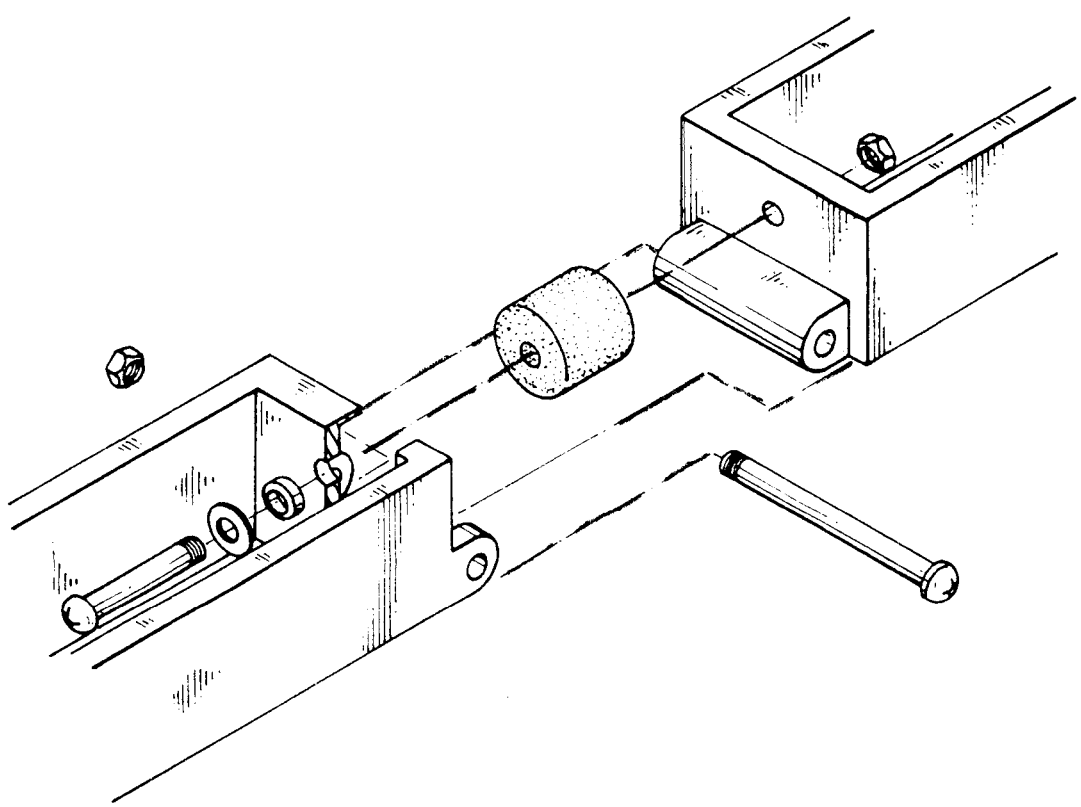
FIG. 5 shows one prior art kick scooter shock absorbing structure.
Figure 6:
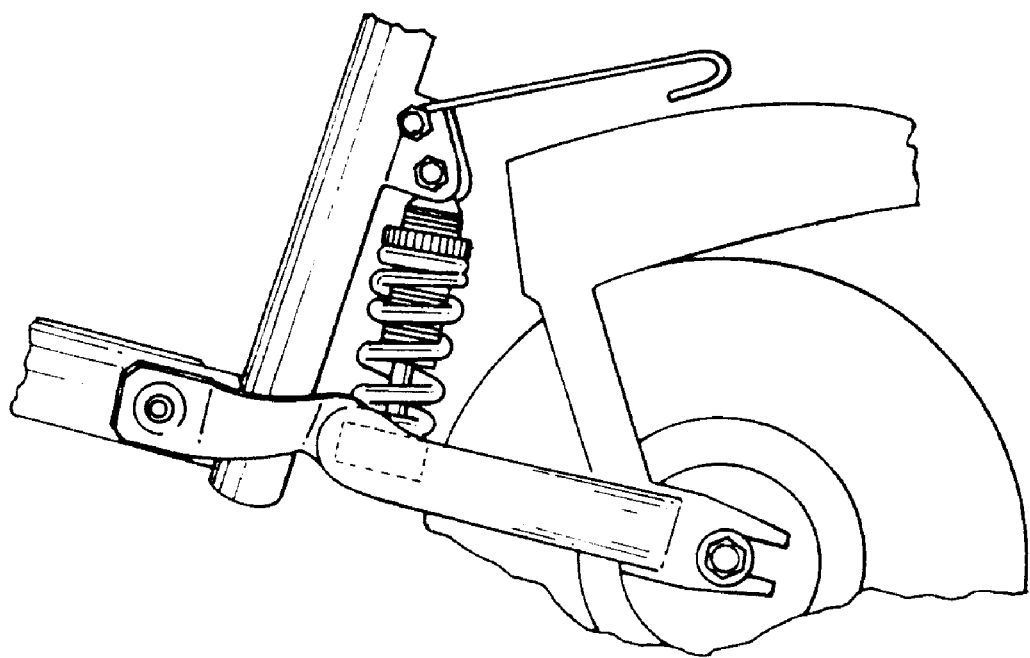
FIG. 6 shows another prior art kick scooter shock absorbing structure.

Referring to FIG. 4, when the front wheel 21 is vibrated, shocks are transmitted to the connection area between the front wheel guard 40 and the wheel holder arms 50 and lessened, thereafter the shock absorbing body 61 and the rubber buffer element 64 absorb the residual shocks. Therefore, shocks are eliminated from passing through the upright handle 30 to the user's hands.

If the shock absorbing body 61 is loosened after a long use or a different shock absorbing strength is required to fit a different rider, the adjustment knob 632 can be fastened tight or loosened to adjust the tightness of the shock absorbing body 61, enabling the shock absorber 60 to achieve the best performance.

Further, because the front wheel 21 is pivoted to the wheel holder arms 50 and the wheel holder arms 50 are pivoted to the front wheel guard 40, the kick scooter is kept running forwards when the rider tilt the kick scooter forwards to add pressure to the front wheel 21.

A prototype of kick scooter shock absorbing structure has been constructed with the features of the annexed drawings. The kick scooter shock absorbing functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A kick scooter shock absorbing structure comprising a front wheel guard connected to the body of a kick scooter, two wheel holder arms pivoted to said front wheel guard to hold a front wheel, and a shock absorber connected between said wheel holder arms and said front wheel guard of said kick scooter to absorb shocks from said front wheel;

said shock absorber comprises a locating member coupled between the front pivot hole of each of said wheel holder arms, a shock absorbing body mounted on the front coupling portion of said front wheel guard at a top side, a rubber buffer element connected between the front coupling portion of said front wheel guard and said locating member, and a locking device, which fastens said shock absorbing body and said rubber buffer element to said front wheel guard and said locating member.

* * * * *